[11] 3,582,605

[72] Inventor Hans Lamatsch
 Nurnberg, Germany
[21] Appl. No. 846,635
[22] Filed July 16, 1969
[45] Patented June 1, 1971
[73] Assignee Siemens Aktiengesellschaft
 Berlin, Germany
[32] Priority Feb. 11, 1966
[33] Germany
[31] S101970
 Continuation of application Ser. No. 614,893, Feb. 9, 1967, now abandoned.

[54] METHOD FOR WELDING METAL PARTS HAVING DIFFERENT CROSS SECTIONS
 3 Claims, 3 Drawing Figs.
[52] U.S. Cl. .................................................. 219/121
[51] Int. Cl. ............................................ B23k 15/00
[50] Field of Search .............................. 219/121, 121 (EB), 69, 137; 250/49.5 (O), 49.5

[56] References Cited
UNITED STATES PATENTS

| | | | |
|---|---|---|---|
| 2,447,085 | 8/1948 | Odlum .......................... | 219/104 |
| 2,987,610 | 6/1961 | Steigerwald .................. | 219/121 |
| 3,134,013 | 5/1964 | Opitz et al. .................. | 219/121 |
| 3,185,815 | 5/1965 | Anderson ..................... | 219/121 |
| 3,384,308 | 5/1968 | Cupler ......................... | 219/121 |

FOREIGN PATENTS

| | | | |
|---|---|---|---|
| 1,338,837 | 8/1963 | France ......................... | 219/121 |

OTHER REFERENCES

" Better Less Costly Bi-Metal Turbine Wheels EB Welded," Reprinted from Welding Engineer August 1962, (Copy found in Class 219— 121 EB)

" Production Applications of Electron Beam Welding," By J. W. Meier, Paper No. 63— WA-122, The American Society of Mechanical Engineers, Winter Annual Meeting Nov. 17— 22, 1963, Pages 1— 7 (Copy Found Class 219— 121 EB)

*Primary Examiner*—J. V. Truhe
*Assistant Examiner*—Robert O'Neill
*Attorneys*—Curt M. Avery, Arthur E. Wilford, Herbert L. Lerner and Daniel J. Tick

ABSTRACT: A recess is formed in one metal part corresponding in cross section to another metal part at a location of the first-mentioned metal part at which the other metal part is to be connected. The other metal part is then snugly inserted in the recess, and an electron beam is applied to the parts parallel to the plane of engagement between both parts so as to connect the parts by butt welding.

METHOD FOR WELDING METAL PARTS HAVING DIFFERENT CROSS SECTIONS

This application is a continuation of Ser. No. 614,893 filed Feb. 9, 1967 now abandoned.

The invention relates to a method of welding metal parts having different cross sections and more particularly to welding such parts by means of an electron beam.

The welding of metal parts having different cross sections by means of an electron beam so as to provide a butt weld therebetween could not be completely solved until now because, on the one hand, the surface of the larger part also becomes exposed to the beam and damaged and, on the other hand, the weld seam always collapses somewhat and the material cross section and the strength or durability of the device to be produced is thereby weakened.

With parts having different cross section, which vary furthermore in the direction of the weld, there is a further complication that the control or regulation of the welding power in accordance with the varying cross section of the part to be welded is very difficult. Thus, for example, in the construction of turbine wheels, the further difficulty arises that the turbine blades mutually overlap so that the thick head of the one blade profile must be welded to the middle portion of the wheel simultaneously with the thin side of the adjacent blade. To avoid this, blades with a square-shaped foot are used. These have a constant cross section in the direction of the weld and can therefore be welded relatively easily to the middle portion of the wheel by means of the electron beam method. This solution has a disadvantage, however, in that expensive tracer-milled blades must be used.

It is accordingly an object of my invention to provide method of welding metal parts having different cross sections which avoids the aforementioned disadvantages of the heretofore known methods and which more particularly avoids the necessity for expensive milled parts.

With the foregoing and other objects in view I provide in accordance with my invention a method for welding metal parts having different cross sections, which comprises forming a recess in one metal part corresponding in size to the cross section of the other metal part at the location of the one metal part at which the other metal part is to be welded, inserting the other metal part flush into the recess formed in the one metal part, and applying an electron beam to the parts parallel to the plane of engagement between both parts so as to connect the parts to one another with a butt weld.

In accordance with a further feature of my invention, I place a plate provided with at least one recess on a location of a metal part to which another metal part is to be welded, the recess having a size corresponding to the cross section of the other metal part, and the plate is pressed against the first-mentioned metal part. The other metal part is then snugly inserted in the recess formed in the plate. The parts are then connected together by the action of an electron beam applied parallel to the engagement surface of the metal parts which produces a butt weld therebetween.

The recess, in accordance with further features of my invention, can be produced fundamentally, for example, by milling, etching, spark erosion or electrochemical recessing.

In accordance with a further feature of my invention, it is unnecessary that the separating or engaging surfaces between the metal parts that are to be connected are flat surfaces; they can also be uneven as long as they are formed by a series of straight lines, i.e., the locus of a line. Thus, for example, conical or cylindrical surfaces can be used.

Other features which are considered as characteristic for the invention are set forth in the appended claims.

Although the invention is illustrated and described herein as method for welding metal parts having different cross sections, it is nevertheless not intended to be limited to the details shown, since various modifications and changes may be made therein without departing from the spirit of the invention and within the scope and range of equivalents of the claims.

The method of the invention, however, together with additional objects and advantages thereof will be best understood from the following description of specific variations thereof when read in connection with the accompanying drawings, in which.

Figure 1:
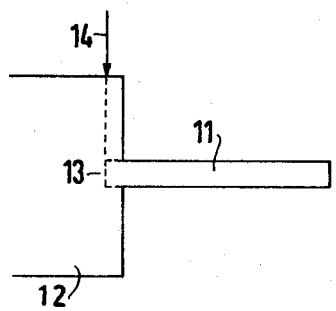
FIG. 1 is a diagrammatic view of a weld connection between two parts of different cross section.

Referring now to the drawing, and first particularly to FIG. 1 thereof, there are shown schematically two metal parts 11 and 12 having different cross sections which are welded to one another by means of an electron beam represented by the arrow 14. The part 11 is inserted in a recess formed in the part 12. By means of the electron beam 14 which is applied parallel to the plane 13 of separation or engagement between the metal parts 11 and 12, both of the metal parts are welded to one another. The weld seam is located, in this case, in the interior of the part 12 whereby a collapse of the weld seam and damage to the surface of the part 12 is thereby avoided.

Figure 2:
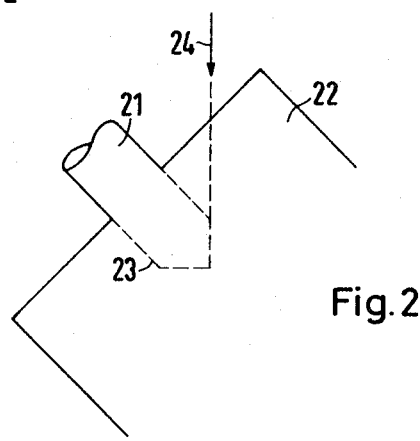
FIG. 2 is a diagrammatic view of another weld connection between two metal parts of different cross section wherein the separating or engaging surface between the two parts is a conical surface.

FIG. 2 shows another example of the use of my welding method wherein a pin 21 of circular cross section is welded to a second part 22 of larger cross section with the aid of an electron beam 24. The only difference between FIG. 2 and FIG. 1 is that the engagement or dividing surfaces of the parts are conical surfaces 23.

Figure 3:
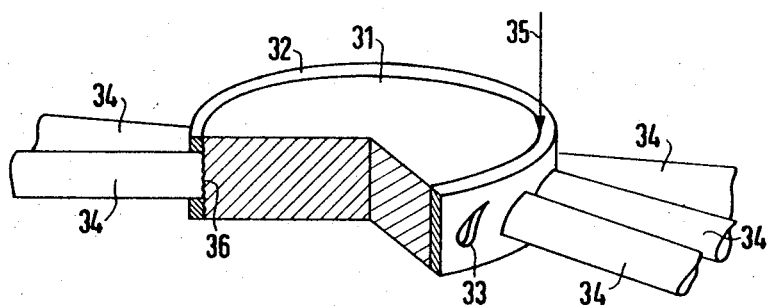
FIG. 3 is a partly sectional, partly broken away, perspective view of turbine blades welded to a wheel-shaped middle part.

In FIG. 3 there is schematically shown a turbine wheel produced in accordance with the method of my invention. It deals with the welding of a series of turbine blades 34 extending in a radial direction from a wheel-shaped middle part 31. A band 32 of plate or sheet metal having a thickness of about 2 mm. and formed with recesses 33 is placed about the wheel-shaped middle part 31 and is suitably held rigid by a nonillustrated tensioning device. The recesses 33 correspond in size and shape to the cross section of the turbine blades 34 which are to be welded. The base surfaces respectively of the recesses 33 are formed by the curved surface of the middle part 31. The turbine blades 34 are inserted into these recesses 33. The turbine blades can consist of inexpensive drawn blade profile material such as high alloy steels of the type indicated, for example by the code X 15 Cr 13 which represents 0.15 percent carbon and 13 percent chromium. The middle part 31 and the sheet metal ring 32 can also consist of the same high alloy steel. The fact that the blades can be inexpensively made of drawn material is a particular advantage of my invention. The surface of the blades and the end thereof which is inserted into the recesses 33 of the ring 32 must be provided with a cylindrical concave shape corresponding to the curvature of the surface of the middle part 31 so that a uniformly narrow gap is provided between the middle part and the blades. The blades are held in place in an additional clamping jig (not shown) so that they lie snugly on the middle part 31 with their concave ends which are inserted in the recesses 33. This clamping jig can advantageously be a part of the aforementioned nonillustrated tensioning device. If the entire assembly is permitted to rotate in an electron beam welding machine so that the electron beam which is indicated by the arrow 35 passes through the dividing or engaging surface between the middle part and the ring or blades in the axial direction of the wheel, the sheet metal ring 35 and the blade 34 are then butt welded to the middle part 31. The cross section in the direction of welding remains constant, however, and collapse of the welding seam 36 and damage to the surface of the middle part 31 or of the metal band 32, as the case may be, is avoided.

In principle, the middle part 31 can also, for example, be polygonal in shape and the blades can have ends provided with a flat surface inserted into the recesses 33. However, this type of construction requires a somewhat complicated guide for the electron beam which must follow the polygonal shape of the middle part.

A particular advantage of the method of my invention is that the part to be welded can have a varying cross section in the direction of welding without having to vary the direction of welding.

I claim:

1. Method of welding together metal structures having different cross sections varying in welding direction, which comprises forming a recess at the surface of one metal structure at a location thereof at which the other metal structure is to be welded thereto, the recess having a varying cross section corresponding in size and shape to the varying cross section of the other metal structure, inserting the other metal structure into the recess so that it is in flush engagement with the base of the recess, and applying an electron beam to the metal structures in direction of varying cross section thereof and parallel to the plane of engagement of said other metal structure and the base of said recess so as to connect the metal structures to one another with a butt weld.

2. Method according to claim 1, wherein the one metal structure has two parts, one of the parts being a plate, and including the steps of forming a hole in the plate and pressing the plate against the other part of the one metal structure to form the recess.

3. Method according to claim 2, wherein the one metal structure has a wheel-shaped member and a band secured on the peripheral surface thereof, and the other metal structure is a turbine blade.